Patented Mar. 2, 1943

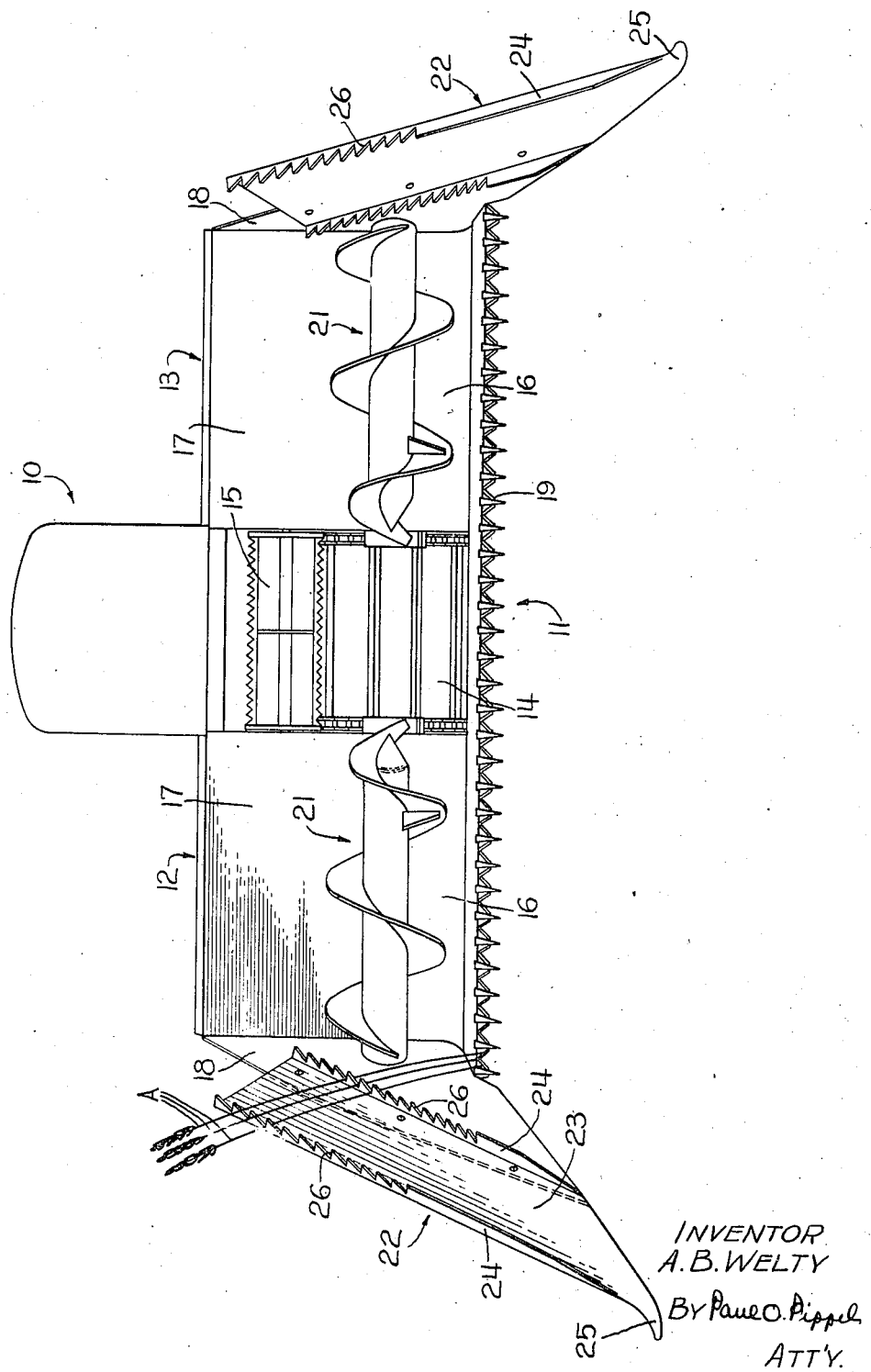

2,312,785

UNITED STATES PATENT OFFICE 2,312,785

GRAIN DIVIDER

Albert B. Welty, Moline, Ill., assignor to International Harvester Company, a corporation of New Jersey Application March 24, 1941, Serial No. 384,777

6 Claims. (Cl. 56—314)

This invention relates to harvesters. More specifically, the present invention relates to an improved grain divider construction adapted for use with mobile type harvester threshers or grain harvesting machines.

It has been the practice to provide a conventional loop divider at each end of the platform of a harvester. These dividers part the grain, so that the grain ahead of the platform may be cut, and the grain at the side of the platform may be left standing. This type of divider, however, is not satisfactory since it allows some of the cut grain to fall outwardly beyond the width of the platform and onto the grain which has not been cut. Consequently, this grain is not picked up until the machine cuts the next swath. It is desirable, however, that the grain which is cut by the cutting mechanism, that is provided at the front part of the platform, be conveyed directly into the thresher where it can be threshed.

An important object of the present invention is to provide a grain divider for a harvester thresher which will effectively retain cut grain near the divider on the harvester platform.

Another object of the present invention is to provide a novel grain divider which will allow the grain to fall onto the platform after it is cut, but not allow the cut grain to fall outwardly on the grain that has not been cut.

These and other objects and advantages of the present invention will become apparent when viewed in the light of the disclosure shown in the accompanying sheet of drawings.

In the drawing, the illustration discloses a front perspective view of the platform of a thresher, a novel grain divider being mounted at each end of the platform.

Referring to the drawing, 10 denotes the separator of a harvester thresher at the front of which is provided a platform 11, which comprises a portion 12 at the right side of the machine, and a portion 13 at the left side of the machine. Between the portions 12 and 13 is mounted a longitudinally disposed elevating conveyor 14 above which is mounted a beater 15, which beater and beater conveys the cut grain into conveyor and beater conveys the cut grain into the separator 10 to be threshed. The conveyor 14 and the beater 15 are adapted to be driven from any suitable source of power. The portions 12 and 13 of the platform 11 comprise a trough portion 16 from which extends an upwardly extending backing sheet 17. At the grainward ends of the platform 11 are provided substantially vertically disposed end plates 18. The conventional cutting mechanism is provided along the front end of the trough portions 16 and across the front of the conveyor 14. Within the trough portion 16 is mounted an auger type conveyor 21, one of the conveyors 21 is provided in the left hand portion 12 of the platform, and the other conveyor 21 is mounted in the right hand portion 13 of the harvester platform. The auger type conveyors 21 are also adapted to be driven from any suitable source of power so as to convey grain cut by the cutting mechanism 19 onto the longitudinally disposed conveyor 14. The novel grain divider is associated with each of the end plates 18 of the harvester platform.

The novel grain divider 22 comprises a rectangular piece of metal 23, opposite sides 24 of which are bent at an angle upwardly with respect to the rectangular piece of metal 23. The forward portion of the rectangular piece of metal 23 is provided with a point 25 which cuts through the grain as the machine advances over the field. The opposite sides 24 are provided with a plurality of recesses 26 which are so formed that the grain being cut, which is indicated at A, will be retained by the recesses 26 so as not to fall onto the grain which is not cut at the end of the platform. It will be appreciated that as the machine advances through the grain the standing grain will move the grain A, which is retained by the recesses 26, rearwardly into the troughs 16, from which the auger type conveyors 21 convey said grain onto the longitudinal conveyor 14.

From the above description it should be obvious that an improved grain divider has been provided for a harvester platform. The grain divider retains the cut grain on the platform until such time as the standing grain moves the cut grain into the auger type conveyor. The divider 22 also holds the grain so that it will not fall onto the grain which is not cut.

While only a preferred embodiment of the present invention has been illustrated in the accompanying sheet of drawing, it is to be understood that widely different means may be employed in the broader aspects of this invention, and it is the intention to limit this invention only within the scope of the appended claims.

What is claimed is:

1. A grain divider for a harvester platform comprising a member associated with the grainward end of said platform so as to part the grain on forward travel of the platform, and grain retaining portions extending from said member at the platform side of the member.

2. In combination, a harvester platform having a cutting mechanism for cutting grain and means for conveying the cut grain into the harvester, a grain divider associated with the grainward end of the platform and comprising a plate member positioned in a vertical plane with respect to the cutting mechanism and extending forwardly thereof, and grain retaining portions extending from said plate member at the platform side thereof.

3. In combination, a harvester platform having a cutting mechanism for cutting grain, a longitudinally disposed conveying means positioned at approximately the center of the platform, conveying means at each side of the platform for conveying cut material onto the longitudinally disposed conveying means, a grain divider associated with each end of the platform, and grain retaining means extending from each of said grain dividers at the platform side thereof.

4. In combination, a harvester platform having a cutting mechanism for cutting grain, a longitudinally disposed conveying means positioned at approximately the center of the platform, conveying means at each side of the platform for conveying cut material onto the longitudinally disposed conveying means, a grain divider associated with each end of the platform, and comprising a plate member positioned in a vertical plane with respect to the cutting mechanism and extending forwardly thereof so as to part the grain, and opposed edges of said plate member having flanges extending toward the platform and having recesses formed therein for retaining the cut grain.

5. In combination, a harvester platform having a cutting mechanism for cutting grain, a longitudinally disposed conveying means positioned at approximately the center of the platform, conveying means at each side of the platform for conveying cut material onto the longitudinally disposed conveying means, a grain divider associated with each end of the platform, and disposed in a vertical plane with respect to the cutting mechanism, and a plurality of serrated portions disposed on the divider at the platform side thereof for retaining the cut grain.

6. In combination, a harvester platform having a cutting mechanism for cutting grain, a longitudinally disposed conveying means positioned at approximately the center of the platform, conveying means at each side of the platform for conveying cut material onto the longitudinally disposed conveying means, an end sheet provided at each end of the platform, and serrated portions provided on the end sheet at the platform side thereof for retaining the cut grain.

ALBERT B. WELTY.